Nov. 25, 1941.  H. W. GILBERT ET AL  2,263,555
COMBINATION CLOTH FEEDING AND LAYING-UP MACHINE
Filed Dec. 12, 1940 7 Sheets-Sheet 1

INVENTORS
HERMAN WALTER GILBERT, WALTER DEICHMANN,
BY and FRANK H. DEXTER.
 ATTORNEY.

Nov. 25, 1941.   H. W. GILBERT ET AL   2,263,555
COMBINATION CLOTH FEEDING AND LAYING-UP MACHINE
Filed Dec. 12, 1940   7 Sheets-Sheet 3

INVENTORS
HERMAN WALTER GILBERT, WALTER DEICHMANN,
BY and FRANK H. DEXTER
ATTORNEY.

Nov. 25, 1941.  H. W. GILBERT ET AL  2,263,555
COMBINATION CLOTH FEEDING AND LAYING-UP MACHINE
Filed Dec. 12, 1940  7 Sheets-Sheet 4

INVENTORS.
HERMAN WALTER GILBERT, WALTER DEICHMANN,
and FRANK H. DEXTER
BY
ATTORNEY.

Nov. 25, 1941.  H. W. GILBERT ET AL  2,263,555
COMBINATION CLOTH FEEDING AND LAYING-UP MACHINE
Filed Dec. 12, 1940   7 Sheets-Sheet 6

INVENTORS
HERMAN WALTER GILBERT, WALTER DEICHMANN,
and FRANK H. DEXTER
BY
ATTORNEY.

Patented Nov. 25, 1941

2,263,555

UNITED STATES PATENT OFFICE 2,263,555

COMBINATION CLOTH FEEDING AND LAYING-UP MACHINE

Herman Walter Gilbert, Kew Gardens, and Walter Deichmann, Elmont, N. Y., and Frank H. Dexter, Clifton, N. J., assignors, by direct and mesne assignments, to Cutting Room Appliances Corp., New York, N. Y., a corporation of New York Application December 12, 1940, Serial No. 369,714

16 Claims. (Cl. 270—31)

This invention relates to new and useful improvements in a cloth laying-up machine, and has more particular reference to a combination feeding and laying machine of this type.

Heretofore laying-up machines have been produced which are characterized by carriages adapted to be reciprocated back and forth on a table for laying-up cloth material thereon. It is customary to use a clamp device at each end of the path of reciprocation arranged to catch and hold the folds. While this type of machine is satisfactory for certain kinds of goods, particularly material which does not stretch very much, it is unsatisfactory for material which may easily stretch. The reason for this is that such stretchable material will stretch to different degrees during this laying-up operation and subsequently when the laid up layers are cut to produce the various parts of a garment the parts thereof will be distorted when they spring back from their stretched positions.

Heretofore laying-up machines have also been produced having feeding mechanisms for continuously feeding the cloth in one direction during the reciprocation of the carriage of the machine back and forth. Theoretically, machines of this type are capable of laying up different kinds of material without imparting any stretch since at all times the material is being fed. Practically, the operation of this type of machine is not ideal for all types of fabrics, as some fabrics should be slightly stretched as they are laid up. This is particularly true for those types of fabrics having an initial "set" position which subsequently straightens out. Pattern pieces cut from laid up cloth of this type will stretch and be too large.

This invention particularly proposes a cloth laying-up machine which has a combination action consisting of laying and feeding. The invention proposes to provide an arrangement which will control the period of each reciprocation during which the machine is laying, or feeding cloth. With this particular arrangement it is possible to regulate the machine so that it is feeding at the end portions of its path of reciprocation so as to take away the strain of stretching of the end portions of each layer, as these end portions are gripped by the clamping mechanisms. It is proposed that intermediate the length of its path of reciprocation, the machine lay the cloth and not feed it.

Still further the invention proposes to provide adjustable abutment members adapted to be fixedly secured at various positions along the path of reciprocation of the carriage of the cloth laying machine, to control the mechanism which switches the machine from feeding to laying, and vice versa. With this arrangement it is possible to adapt the cloth laying machine for the most optimum operation for all types of material.

Still further the invention proposes to characterize the combination cloth laying-up and feeding machine by the fact that a pair of contacting feed rollers is provided, controlled by a mechanism for continuously driving these feed rollers in one direction at speeds to feed the cloth at the same rate that the carriage is moved along said table in either direction, and a means is also provided for separating these rollers when said carriage is in positions between the ends of its stroke so that the moving carriage may lay said cloth web on the table and said latter means also controlling the contacting of these rollers when the carriage is at the end portions of its path of reciprocation to cause feeding of the cloth at these periods.

Another object of this invention is to provide a simple and efficient drive means for continuously driving one of said feed rollers in one direction at speeds to feed said cloth at the same rate that said carriage is moved along said table in either direction. It is proposed to characterize this drive means by a pair of one way clutches and a certain transmission system. With this arrangement the necessity of shifting gears, or requiring mechanical clutching and declutching has been eliminated.

Still further the invention proposes a roller support frame movably mounted on the carriage of the cloth laying machine and having a front portion, and it is proposed to provide means for guiding said front portion to move in a vertical path for reasons which will become clear as this specification proceeds. The invention particularly has in mind the construction of a simple and durable mechanism to comprise said means to move the said front portion in the vertical path.

Another object of the invention resides in the provision of a mechanism for automatically moving the front portion of the roller support frame upwards during the reciprocation of the carriage, to compensate for the fact that the cloth is being stacked in layers and additional room is required as the pile of stacked layers increases.

Still further a novel adjustment is proposed for controlling the speed at which the front portion of the roller support frame is raised to make same adjustable for cloths of different thicknesses.

For further comprehension of the invention, and of the object and advantages thereof, reference will be had to the following description and accompanying drawings, and to the appended claims in which the various novel features of the invention are more particularly set forth.

In the accompanying drawings forming a material part of this disclosure:

Fig. 17 is a vertical sectional view taken on the line 17—17 of Fig. 16.

Figure 10:
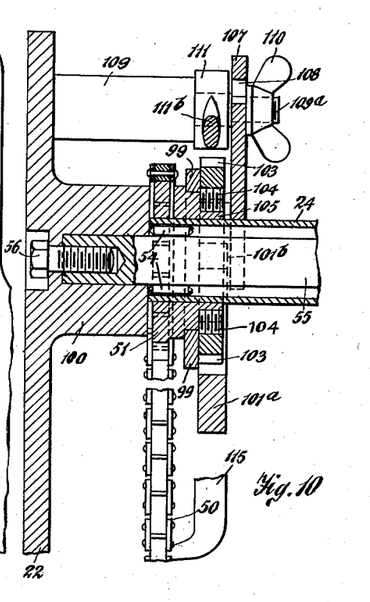
Fig. 10 is a fragmentary vertical sectional view taken on the line 10—10 of Fig. 9.
Figure 12:
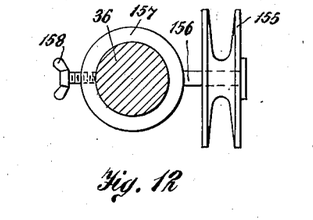
Fig. 12 is a fragmentary vertical enlarged sectional view taken on the line 12—12 of Fig. 2.

The combination cloth laying-up and feeding machine, in accordance with this invention, includes a carriage 20 for supporting a supply of cloth and adapted to be reciprocated back and forth on a table 21. The carriage 20 includes a pair of laterally spaced side walls 22 and 23 which are fixedly held together by several tie tubular members 24 and rods 55, see Figs. 3 and 10. A perforated sheet metal top 25 is mounted across the top edges of the side walls 22 and 23. The side walls 22 and 23 are formed with laterally projecting web flanges 26, 27, etc., for reinforcement purposes. Wheels 28 are rotatively mounted upon the front and rear ends of the side wall 23 and rest upon the table 21 for supporting one side of the carriage 20. The other side of the carriage 20 is supported by wheels 29 which are rotatively mounted on the side wall 22 and which rest on a track 30 attached on the near side of the table 21.

Figures 3, 6, 11:
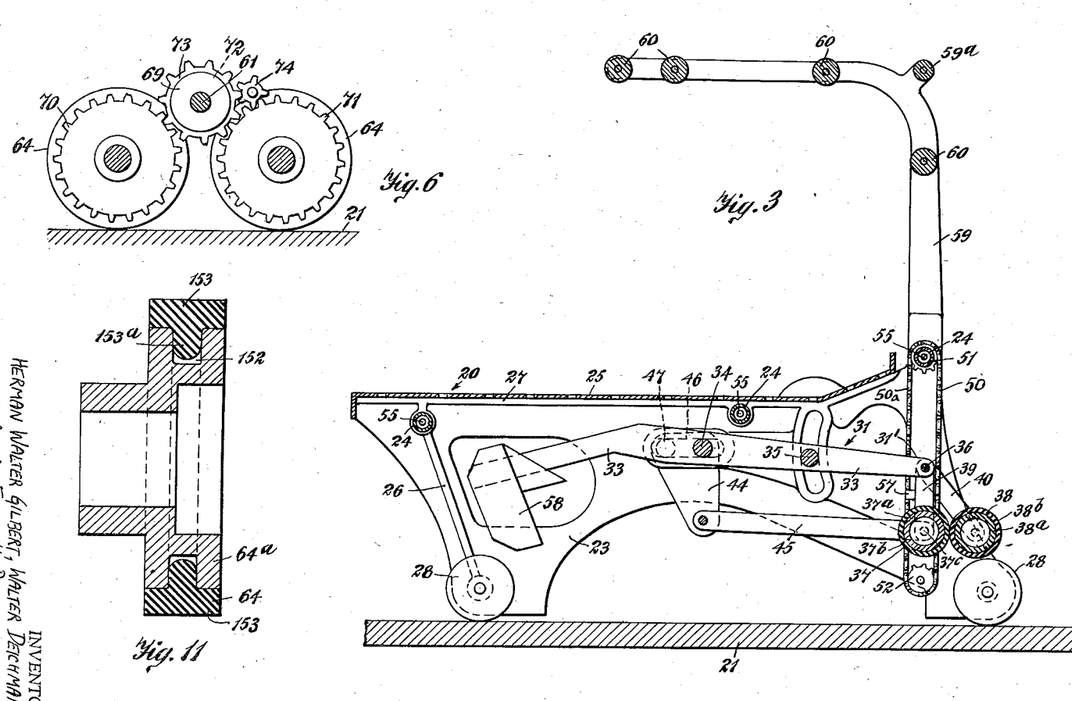
Fig. 3 is a longitudinal vertical sectional view taken on the line 3—3 of Fig. 2.
Fig. 6 is a fragmentary vertical sectional view taken on the line 6—6 of Fig. 5.
Fig. 11 is a vertical sectional view of one of the drive wheels of the drive means for continuously driving one of the said feed rollers, as previously explained.

A roller support frame 31, see Fig. 3, is movably supported on the carriage 20 and has a front portion 31'. The roller support frame 31 comprises a pair of spaced side arms 32 and 33 arranged inside of the side walls 22 and 23. The side arms 32 and 33 are fixedly tied together by several rods 34, 35 and 36. The rod 36 is mounted across the front portion 31' of the roller support frame 31. The other rods are mounted rearwards of this front rod 36. A pair of contacting feed rollers 37 and 38 are mounted on the front portion 31' for receiving and feeding a web portion of a supply of cloth (not shown on the drawings) which during the operation of the machine is mounted on or above the carriage 20. The roller 37 has an internal core 37a and a rubber cover 37b. The roller 38 has an internal core 38a and a rubber cover 38b.

The feed roller 37 is rotatively supported between a pair of downwardly depending arms 39 which depend from the rod 36, by trunnion elements 37c. The roller 38 is rotatively supported on a pair of forwardly extending and downwardly depending arms 40 which are also turnably mounted on the rod 36. The rollers 37 and 38 are disposed substantially on a horizontal plane. Since the arms 40 extend forwards and downwards the roller 38 engages the roller 37 due to the action of gravity on it.

Means is provided for guiding said front portion 31' of the roller support frame 31 to move in a vertical path. This means includes parallelograms of arms extending rearwards from the arms 39 and including the said arms 39. For each arm 39 there is a separate parallelogram of arms. The parallelogram of arms on the near side of the machine as viewed in Fig. 1 comprises the side arm 32, the vertical arm 39, a substantially vertical rear arm 42, and an arm 43 which is parallel to the arm 32. These arms are pivotally connected together. The parallelogram of arms on the far side of the machine, see Fig. 3, includes the arm 33, the vertical arm 39, a rear vertical arm 44, and a connecting arm 45. The arms 39 and 44 are parallel to each other and the arms 33 and 45 are parallel to each other. These arms are also pivotally connected.

Means is provided for horizontally supporting the rear top corners of the said parallelograms of arms. This means includes the rod 34 which has its end portions extended, and slidably engaging into horizontal slots 46 formed in the side walls 22 and 23 of the carriage 20. A peg 47 is mounted on each of the rear arms 42 and 44 of the parallelogram of arms. These pegs 47 are disposed rearwards of the rod 34 and on the same horizontal plane, and also engage in the slots 46 of the side walls 22 and 23.

Means is provided for moving one of the rearwardly extending side arms of each of said parallelogram of arms forwards and rearwards to maintain said front vertical arm 39 in a vertical path when the roller support frame 31 is moved upwards and downwards. This means includes the rod 35 which has its ends projecting and engaging into arcuately shaped cam slots 48 formed in the side walls 22 and 23 of the carriage 20. These slots 48 are of such shapes that the front portion 31' of the roller support frame 31 can move only in a true vertical plane. It should be realized that the rod 34 comprises a pivot for the roller support frame 31. However, this pivot 34 is slidable in the horizontal slots 46, and this sliding motion is guided by the curvature of the slots 48 which are designed to maintain the front portion 31' in a vertical plane, as the front portion 31' is moved upwards and downwards.

Figure 2:
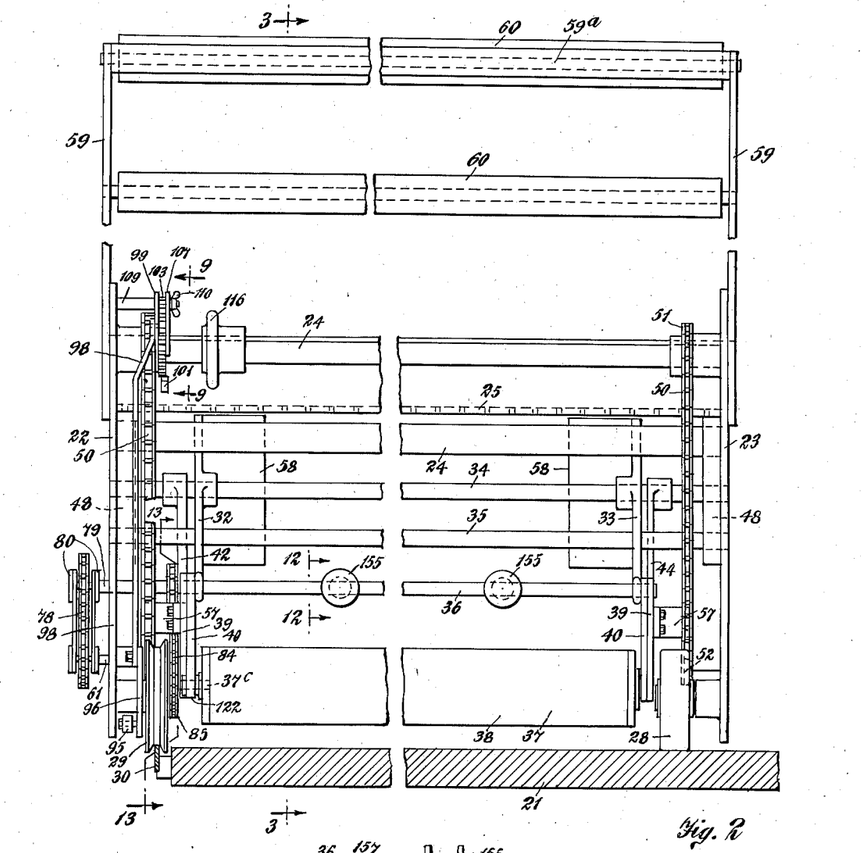
Fig. 2 is an end elevational view of Fig. 1 looking from the right hand end.

An endless member 50 is movably mounted on each side wall of the carriage 20 and has a side portion 50a arranged to move in a vertical path. More specifically, each endless member 50 comprises a chain 50, and these chains engage over top sprocket wheels 51 and bottom sprocket wheels 52 rotatively supported on the side walls of the carriage 20, see Fig. 3. The bottom sprocket wheels 52 are mounted upon the inner faces of the side walls 22 and 23 of the carriage 20. The top sprockets 51 are fixedly mounted on the front tubular member 24. This front tubular member 24 is rotatively supported by a pin bearing 54 mounted on the rod 55 which is extended through this tubular member 24. This rod 55 is secured to the side walls 22 and 23 by fastening screws 56. Small L-shaped fastening members 57 are attached upon the vertical portions 50a of the endless chains 50, and are also attached to the vertical arms 39, see Fig. 2. The arrangement is such that the vertical side portions 50a of the chains 50 are capable of moving the front portion 31' of the roller support frame 31 in the vertical path mentioned.

The side arms 32 and 33 of the roller support frame 31 extend rearwards of the pivot rod 34. Counterweights 58 are mounted upon the rear ends of these side arms, and serve to counterbalance the roller support frame 31 so that the front portion 31' thereof may easily be moved upwards and downwards. Guiding and tensioning means for supplying a web portion of cloth to the feed rollers 37 and 38 is mounted on the carriage 20. This guiding and tensioning means includes side arms 59 mounted on the side walls 22 and 23 at the front of the machine. These side arms 59 extend upwards and rearwards over the carriage 20. They are tied together with a rod 59a. A plurality of rollers 60 is rotatively mounted between the side arms 59, over and around which the web of cloth may be guided before it is fed in between the feed rollers 37 and 38.

Figure 4:
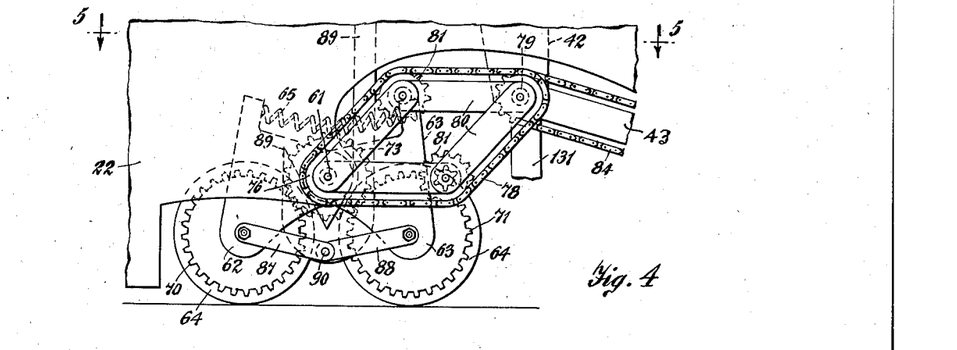
Fig. 4 is a fragmentary enlarged detailed view of a portion of Fig. 1 showing particularly a certain portion of the transmission mechanism at the center of the machine.
Figure 5:
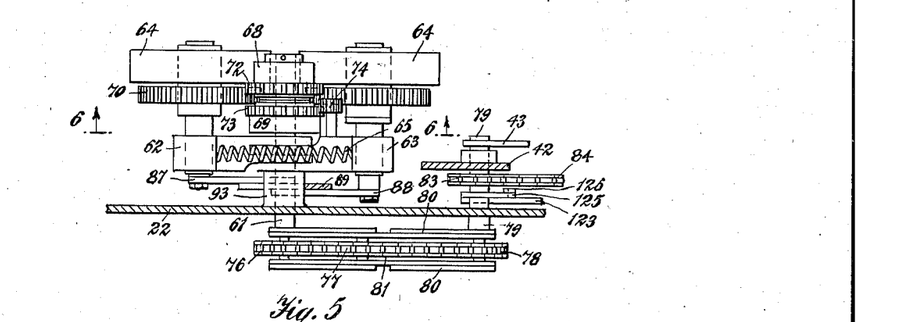
Fig. 5 is a horizontal sectional view taken on the line 5—5 of Fig. 4.
Figures 7, 8:
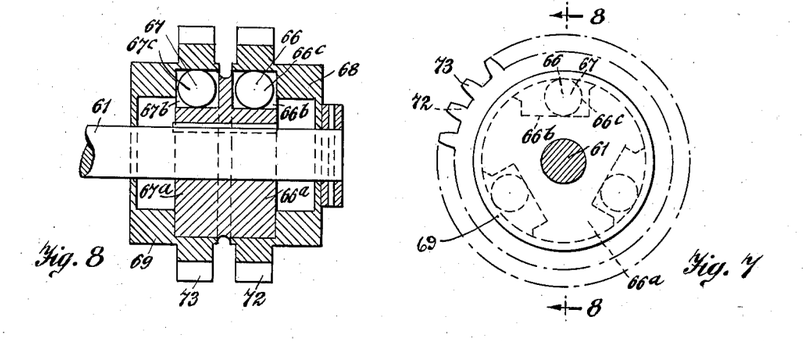
Fig. 7 is a fragmentary enlarged detailed view of a portion of Fig. 6 showing particularly the top center gear and associated mechanism in dotted lines.
Fig. 8 is a fragmentary vertical sectional view on the line 8—8 of Fig. 7.

Drive means is mounted on the carriage 20 for continuously driving one of the feed rollers, preferably the feed roller 37, in one direction at speeds to feed said cloth at the same rate that the carriage 20 is moved along the table 21 in either direction. This drive means includes a main shaft 61 (see Figs. 4 and 5) rotatively mounted on and through the side wall 22 of the carriage 20. A pair of brackets 62 and 63 are turnably mounted on the main shaft 61 and extend in opposite directions (see Fig. 4). A drive wheel 64 is rotatively mounted on each bracket (brackets 62 and 63), and normally engages the table 21. Resilient means is provided for urging the brackets 62 and 63 in directions to engage the driving wheels 64 against the table 21. This resilient means comprises an expansion spring 65 which is mounted between the upper ends of the brackets 62 and 63. This expansion spring 65 is under compression and consequently bowed downwards, as illustrated in Fig. 4. When the top portions of the brackets 62 and 63 are urged apart the bottom portions which carry the drive wheels 64 will be urged downwards against the table 21.

A pair of one way clutches 66 and 67 is mounted on the main shaft 61, and are set in the same direction. The clutch 66 comprises a hub portion 66a fixedly mounted on the shaft 61 having several peripheral cutouts 66b in which rollers 66c are set. A casing 68 is rotative on the shaft 61 and engages over the rollers 66c. The arrangement is such that when the casing 68 is turned in one direction the rollers 66c will be forced into the shallow portions of the slots 66b and transmit rotation to the hub 66a. However, when the casing 68 is turned in the other direction the rollers 66c will be forced into the deep portions of the slots 66b so that no rotation is transmitted to the hub 66a.

The one way clutch 67 is similarly constructed as the clutch 66. It includes a hub portion 67a which is fixed on the shaft 61. This hub portion 67a is formed with peripheral cutouts 67b in which there are rollers 67c. A casing 69 is rotative on the shaft 61 and engages over the rollers 67c. When this casing 69 is turned in one direction the rollers 67c will be forced into the shallow portions of the slots 67b and then the rotations will be transmitted to the hub 67a and shaft 61. However, when the casing 69 is turned in the other direction the rollers 67c will be forced into the deep portions of the slots 67b and there will be no transmission to the shaft 61.

A transmission system is provided from said drive wheels 64 for turning said clutches 66 and 67 simultaneously in opposite directions. This transmission system includes a gear 70 concentrically fixedly mounted on one of the drive wheels 64. Another gear 71 is concentrically fixedly mounted on the other drive wheel 64. The casing 68 is provided with gear teeth 72 which simultaneously mesh with the gears 70 and 71. The casing 69 is provided with gear teeth 73 which do not touch the gears 70 and 71 (see Fig. 5). However, the gear 73 meshes with a pinion 74 rotatively supported on the bracket 63, and this pinion 74 is of sufficient width so as to simultaneously mesh with the gear teeth 73 and the gear 71. It should be noted that the arrangement is such that the drive wheels 64 will drive the casings 68 and 69 simultaneously in opposite directions. Consequently, only one of these casings will, through the medium of its one way clutch, drive the shaft 61 at any particular moment. The shaft 61 will always turn in the same direction even though the drive wheels 64 turn in both directions.

Another transmission system is provided which extends from the main shaft 61 to the said feed roller 37. This latter transmission system includes a sprocket 76 fixedly mounted upon the outer end of the main shaft 61 which extends to the outside of the wall 22. A chain 77 engages over the sprocket 76 and over a sprocket 78 fixedly mounted on a shaft 79 which is rotatively supported on the bottom of the vertical arm 42, concentric with the pivot of the arm 43. A parallelogram of links 80 is connected between the shafts 61 and 79, and support idler sprocket wheels 81 which act to keep the chain 77 in proper tension in all forward and rearward positions of the vertical arm 42. A sprocket 83 is fixedly mounted on the shaft 79 and connects with a chain 84 which extends forwards and engages over a sprocket 85 coaxially fixed on one of the trunnion elements 37c on the feed roller 37, see Fig. 2. The various parts of the transmission are so proportioned that the feed rollers 37 and 38 will feed a cloth web which is engaged between them, at the same linear rate, as the linear speed of the carriage 20 when moved in either direction.

Means is provided for lifting the drive wheels 64 out of contact with the table 21 to stop the feeding operation when this is desired. This means includes a pair of links 87 and 88 which are pivotally connected with each other at their adjacent ends, and which are pivotally connected with the brackets 62 and 63 at their outer ends, concentric with the drive wheels 64. A hook shaped member 89 is pivotally connected at its bottom end by a pintle 90 with the pivotal connected inner ends of the links 87 and 88. This hook shaped member 89 extends upwards and is pivotally connected with the forward end of a lever 91. The lever 91 is pivotally supported intermediate of its ends by a pintle 92 mounted on the wall 22. The hook portion of the hook shaped member 89 straddles a boss 93, see Fig. 5, formed on the inner face of the wall 22 which is concentric with the shaft 61. The arrangement is such that when the rear end of the lever 91 is depressed the hook shaped member 89 will be lifted upwards, lifting up the adjacent ends of the links 87 and 88. In the normal lowered position of these links, they are inclined downwards (see Fig. 4).

When the links 87 and 88 are lifted upwards they spread apart the bottom ends of the brackets 62 and 63. Since the brackets 62 and 63 are pivotally mounted on the shaft 61, the drive wheels 64 will move upwards out of contact with the table 21. The bottom hook portion of the hook shaped member 89 will strike the boss 93 when the hook shaped member 89 is lifted, limiting further upward motion thereof, just after the links 87 and 88 pass their horizontal dead centers. Then the weights of the drive wheels 64, and the brackets 62, and the expansion action of the spring 65 will lock the links 87 and 88 in their new positions. This keeps the drive wheel 64 out of contact with the table 21. It is necessary that the rear end of the lever 91 be pulled upwards to again force the links 87 and 88 into their original down positions, in which the drive wheels 64 engaged the table, when action of the transmission system is again desired.

Means is provided for limiting the distance through which the carriage 20 may be reciprocated on the table 21. This means includes a rear stop 93 adjustably mounted on the track 30 against which the rear wheel 29 will strike when the carriage 20 is moved rearwards. This means also includes a front stop 94 adapted to strike a front portion of the machine. Specifically, it will strike a wheel 95 mounted on an L-shaped lever 96. This L-shaped lever is pivotally supported on the side wall 22 by a pintle 97. It is further supported by a link 98 which is pivotally connected with the lever 96, and which extends upwards and is supported at its top end on an arm 99. The arm 99 is turnably mounted on a boss portion 109 formed on the wall 22. When the carriage 20 is moved to its full front position the roller 95 will strike the stop 94, and so limit forward motion of the carriage. The stops 93 and 94 may be adjusted along the length of the rail 30 and thus the amplitude of possible reciprocation of the carriage 20 may be controlled.

Means is provided, controlled by the reciprocation of the carriage 20, for progressively raising the front portion 31' of the roller support frame 31. This means includes the roller 95, the lever 96, the link 98 and the arm 99. In addition it includes a pawl 101 pivotally mounted on the hub portion of the arm 99 by a pintle 102. The pawl 101 has a heavy tail portion 101a. It also has a top tooth portion 101b. This tooth portion 101b is adapted to engage a ratchet 103 which is fixedly mounted by key screws 104 on a hub 105 fixedly mounted on the tubular member 24 which is at the front of the machine. A shield 106 normally engages the tooth 101b of the pawl 101 holding the pawl 101 from engaging the teeth of the ratchet 103. The shell 106 is adjustably supported. It has an arcuate portion 107 formed with an arcuate slot 108 concentric with the tubular member 24. A screw 109a is fixedly mounted on a rod 109 fixedly mounted on the side wall 22 and having a portion passing through the slot 108.

Figure 9:
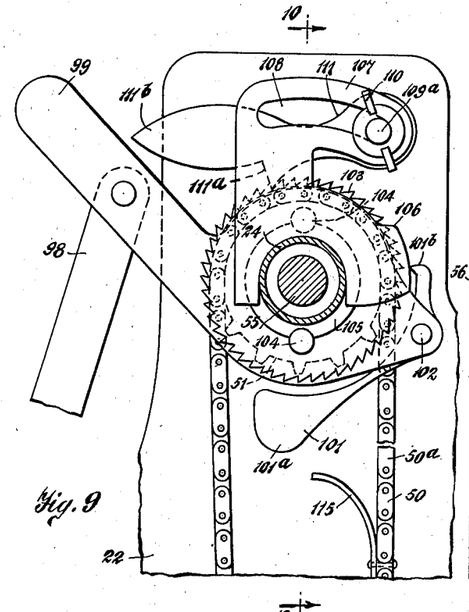
Fig. 9 is a fragmentary enlarged vertical sectional view taken on the line 9—9 of Fig. 2.

A wing nut 110 threadedly engages the screw 109a. This wing nut may be screwed tight against the shield 106 to hold the shield 106 in fixed positions. Another pawl 111 engages the ratchet 103, and is pivotally suported on a portion of the rod 109. The pawl 111 has a tooth 111a which rests on the teeth of the ratchet 103. It has a handle portion 111b which may be manually gripped and moved upwards to free the tooth 111a from the ratchet 103. When the carriage 20 is moved to its complete forward position the roller 95 strikes the stop 94 pivoting the lever 96 downwards. This pulls on the link 98 which pulls the arm 99 downwards. When the arm 99 moves downwards, its other end carrying the pawl 101 will move upwards (see Fig. 9). The position of the shield 106 determines the point at which the tooth 101b of the pawl 101 may engage the teeth of the ratchet 103. Then the ratchet 103 is moved by the pawl 101.

The shield 106 may be adjusted so that the ratchet 103 is moved one tooth, or two teeth, or three teeth, etc. as desired, depending upon the speed at which it is desired to move the front portion 31' of the roller support frame 31 upwards. When the ratchet 103 is turned, the tubular member 24 will turn. Since the tubular member 24 carries the sprockets 51, the chains 50 will be correspondingly turned. This moves the L-shaped fastening members 57 upwards, and so the arms 39. This upward motion of the arms 39 moves the front portion 31' of the roller support frame 31 upwards.

A leaf spring 115 is mounted on the vertical portion 50a of one of the chains 50, and is adapted to strike the tail 101a of the pawl 101 to hold the tooth 101b free of the ratchet 103 when the front portion 31' is in its fully raised position. Thus even though the carriage 20 may be reciprocated backwards and forwards and the roller 95 strikes the stop 94, which will indirectly move the arm 99, the pawl 101 will not engage the ratchet 103 and therefore there will be no further tendency to raise the front portion 31' roller support frame 31.

The front portion 31' of the roller support frame 31 may be manually raised by lifting the handle 111b of the pawl 111 and then turning the tubular member 24 so that the sprockets 51 move the endless chains 50. To facilitate turning the tubular member 24 a wheel 116 (see Fig. 2) is fixedly mounted on the tubular member 24. The front portion 31' may be lowered by lifting the pawl 111 and manually moving it downwards.

Means is provided for separating the feed rollers 37 and 38 when said carriage 20 is in positions between the ends of its amplitude of reciprocation, so that the moving carriage 20 may lay said web of cloth on the table 21, and contacting said feed rollers 37 and 38 when said carriage 20 is at end portions of its amplitude of reciprocation to feed said web of cloth on to the table 21. This means includes a triangular shaped plate 120 pivotally mounted on the bottom of the arm 39 on the trunnion element 37c coaxial with the feed roller 37. One apex of the triangular shaped member 120 is pivotally connected by a pintle 121 to an arm 122 pivotally mounted on the bottom of the arm 40 coaxial with the feed roller 38. The pintle 121 normally is located a substantial distance below the axes of the feed rollers 37 and 38. An arm 123 is Fig. 13, so as not to interfere with the contacting of the feed rollers 37 and 38. An arm 123 is pivotally connected with the third apex of the triangular shaped member 120 by a pintle 124. This arm 123 extends parallel to the arm 43. Its other end is pivotally connected by a pintle 124 with one apex of another triangular shaped member 125. This triangular shaped member 125 is pivotally supported on the shaft 79 at its top apex. The arrangement is such that the arms 43 and 123 and the triangular members 120 and 125 form a parallelogram.

A link 126 is pivotally connected by a pintle 127 to the third apex of the triangular shaped member 125. This link 126 extends downwards and pivotally connects with a crank 128. This crank 128 is coaxially mounted on one side of a sprocket 129 which is rotatively supported on one end of a horizontal arm 130. This arm 130 is fixedly mounted on the bottom of an extension 131 projecting from the arm 42. Another sprocket 132 is rotatively mounted on the arm 130. A chain 133 engages over the sprockets 129 and 132. This chain has its bottom side 133a horizontal, and parallel to the track 30, see Fig. 16. Three pins 135, 136 and 137 are mounted through the chain 133 at certain spaced positions. The pin 136 is located at the center of the side 133a. The pin 137 is located to the right of the pin 136 and is at a distance corresponding with a 180° turn of the sprocket 129. The pin 135 is to the left of the pin 136 and is located at a distance representing a turn of 180° of the sprocket 129.

A pair of abutment members 138 and 138 are adjustably mounted on the track 30 and are adapted to cooperate with the pins 135, 136, and 137 in a certain manner. Each of these abutment members is fixedly held on the track 30 with a set screw 140. The upper end of each abutment member is formed with a groove 141 through which the chain side 133a may pass. The portions of the abutment members to the sides of these grooves 141 are adapted to strike the pins 135, 136 and 137, as may be understood by examining Fig. 17. Normally, with the parts as illustrated in Fig. 16, the pins 135 and 137 are above the top ends of the abutment members so that only the pin 136 is in a position to be engaged by one or the other of the abutment members.

Figures 1, 14, 16:
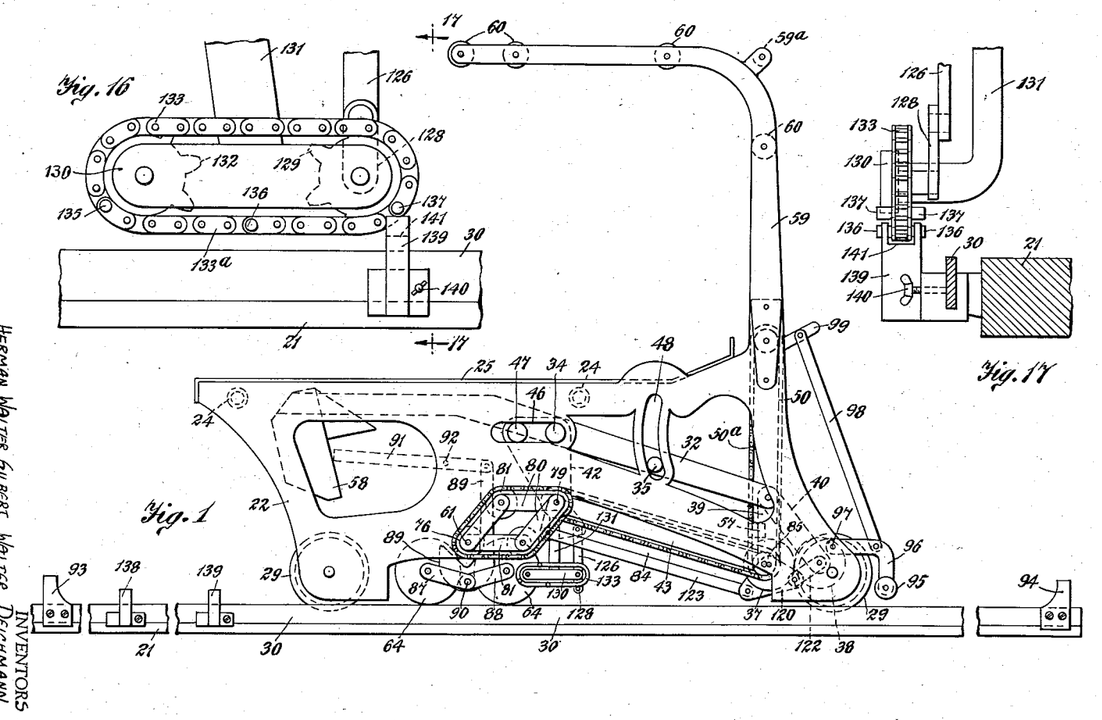
Fig. 1 is a side elevational view of a combination cloth laying-up and feeding machine constructed in accordance with this invention and shown on a table, but illustrated with certain cloth web clamping and holding means removed.
Fig. 14 is a sectional view similar to Fig. 13 but illustrating the parts in a different position.
Fig. 16 is a fragmentary enlarged detailed view of a portion of Fig. 14.
Figure 13:
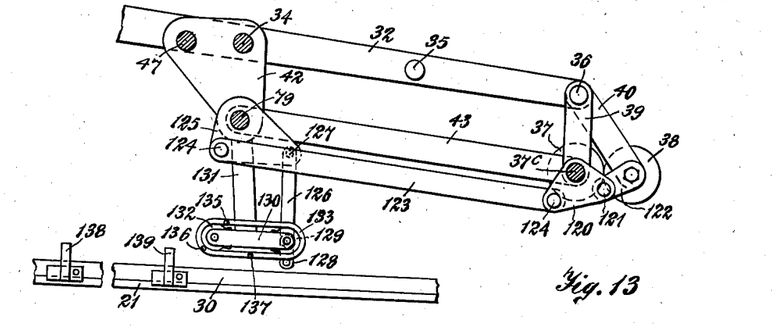
Fig. 13 is a fragmentary enlarged vertical sectional view taken directly behind the rear side wall of the carriage of the machine, as illustrated in Fig. 1, to show certain of the parts in greater detail.
Figure 14:
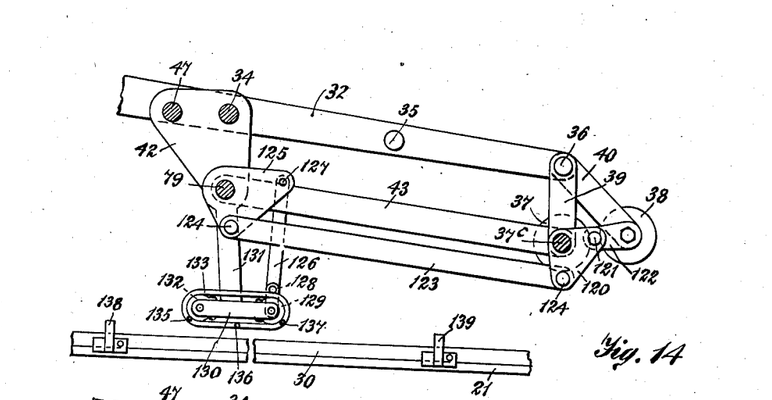

When the carriage 20 is to the right of the abutment members 138 and 139, as illustrated in Figs. 1 and 13, the crank 128 extends downwards. The pins 135, 136 and 137 are in the positions shown in Fig. 13. The feed rollers 37 and 38 are contacting each other. The machine in this condition will feed a web of cloth which is engaged between the feed rollers 37 and 38.

Figure 15:
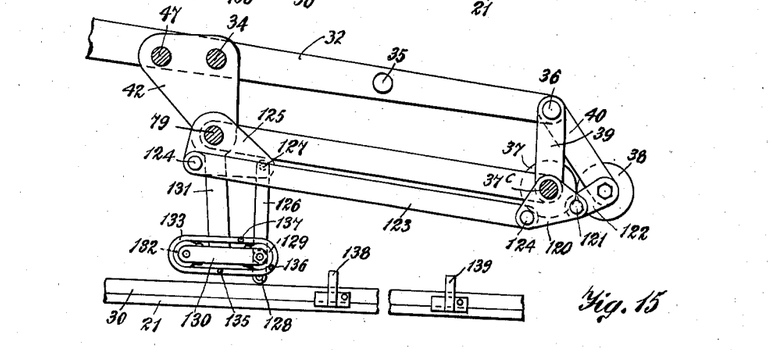
Fig. 15 is another sectional view similar to Fig. 13 but illustrating the parts in still another position.

When the carriage 20 is moved towards the left the abutment member 139 will engage the pin 137 and move the chain 133 counter-clockwise until the pin 137 slips off from the top of the abutment member 139. During this time the crank 128 turned 180° counter-clockwise so that it is now directed upwards. The parts are now in the positions illustrated in Figs. 14 and 16. When the crank 128 moved upwards it moved the link 126 upwards which pivoted the triangular shaped member 125 counter-clockwise from the position shown in Fig. 13 to the position shown in Fig. 14. This motion was transmitted to the triangular shaped member 120 and the arm 122. The pin 121 which connects these parts moved upwards past the dead center of the axes of the feed rollers 37 and 38 spreading these rollers so that they no longer contact each other. The rollers 37 and 38 are held in this spread position because the pin 121 is past the said dead center. During this period the machine will lay the web of cloth and not feed it. The parts maintain this position because of the said dead center arrangement, until the arm 122 and triangular shaped member 120 are moved back to their original downward position. This happens when the carriage 20 is moved either to the left, or to the right so that one of the pins of the chain 133 engages one of the abutment members. Assume that the carriage 20 is being moved towards the left. Consequently, the center pin 136 will strike the abutment member 138 and move the chain 133 into the position shown in Fig. 15. In this position the feed rollers 37 and 38 are again contacting each other. It should be noted that the carriage 20 is now to the left of the abutment members 138 and 139, and the machine is capable of feeding the web of cloth which is to be inserted between feed rollers 37 and 38.

Figures 18, 19:
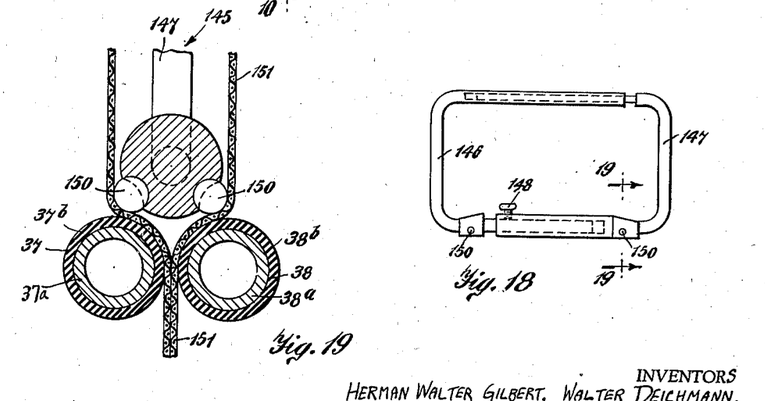
Fig. 18 is an elevational view of a certain spreader device for use with the laying-up machine when tubular goods is being laid up.
Fig. 19 is a fragmentary vertical sectional view as though taken on the line 19—19 of Fig. 18, but to which certain parts of the laying-up machine, and the cloth being fed, has been added.

When tubular goods is laid-up by the machine, a spreading means is necessary to hold the tubular goods in a flat position when passing between the said feed rollers 37 and 38. An improved spreader is illustrated in Figs. 18 and 19. It comprises the usual spreader frame 145 formed of an end section 146 telescopically engaged with an opposed end section 147. A set screw 148 threadedly engages one of the end sections and abuts the other for holding the spreader frame in desired adjustable positions. The spreader frame now departs from conventional construction in the fact that on each end portion of the spreader frame, on the bottom thereof, there is located a pair of balls 150 which are adapted to act through the material of the tubular goods and rest upon and be supported by the feeder rollers 37 and 38.

In Fig. 19 reference numeral 151 indicates a web of tubular goods in which the spreader 145 is engaged. It should be noted that the balls 150 are supported by the feed rollers 37 and 38. This improvement of the spreader is necessary in a machine of the present type in which the feed rollers 37 and 38 move apart to change the feeding operation to a laying operation. If not for the balls 150, the cloth spreader would fall in between the feed rollers 37 and 38 and become jammed, locking the tubular goods, which would be objectionable. However, with the ball bearings 150 arranged as shown in Figs. 18 and 19, the goods will be spread and will be capable of being freely pulled or moved between the feed rollers 37 and 38.

A pair of spaced guide wheels 155 are mounted on the rod 36 of the roller support frame 31. Each of these wheels 155 is mounted on a shaft 156 projecting from a collar 157 which is slidable on the rod 36. A set screw 158 engages through each collar 157 and is capable of holding the collar in fixed positions on the rod 36. It is proposed that the wheels 155 be engaged against the side portions of the frame 145 of the spreader shown in Figs. 18 and 19, to properly hold the spreader through the web of tubular material 151, which is being fed and laid up by the machine.

In Fig. 11 a detail has been shown of one of the drive wheels 64. This wheel is of novel construction. It comprises a metallic wheel body 64a having a peripheral groove 152. A solid endless tire 153 is mounted on the periphery of the wheel body and has a projecting flange portion 153a which engages the groove 152. The tire 153 is of elastic material so that it may be stretched when it is removed from or placed on the wheel body 64a. A feature of this construction resides in the fact that the inter-engaging flange 153a and groove 152 will prevent the tire 153 from coming off the drive wheel.

Figure 20:
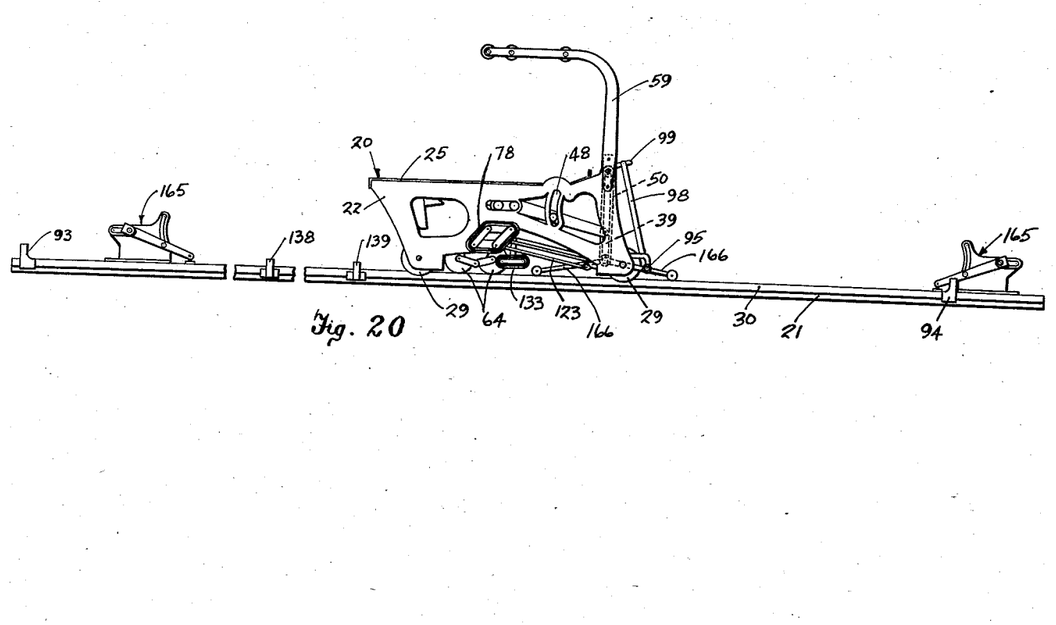
Fig. 20 is a fragmentary side elevational view of a combination feeding and laying-up machine on a table and drawn to a reduced scale and showing the means for clamping and holding the web portion being laid at its ends of the amplitude of reciprocation of the carriage of the device.

Special attention is now called to Fig. 20 disclosing means for clamping and holding the web portion of the supply of cloth to be laid up, at the ends of the amplitude of reciprocation of said carriage 20. Said means includes cloth web clamps 165 mounted on the table 21 at the ends of the amplitude of reciprocation of said carriage 20. Members 166 are mounted on the vertical arms 39 of the cloth laying up machine and are adapted to normally open up the cloth web clamps 165 when the carriage 20 reaches the ends of its amplitude of reciprocation so that the clamps may catch that section of the web portion then being laid.

The operation of the combination cloth laying-up and feeding machine is as follows:

A supply of goods which is to be laid-up is mounted on the carriage 20 in a convenient way. The goods may be placed on the perforated sheet metal top 25, or may be supported on forked arms, not shown on the drawings, which is a usual way of supporting a supply of goods on a laying-up machine. A web of this goods is passed over or around one or more of the guiding and tensioning rollers 60 to properly tension the web of goods during the laying-up operation. The machine is then pushed to a position between the adjustable abutment members 138 and 139 so that the feed rollers 37 and 38 are separated, as shown in Fig. 14. The end of the web is then engaged in between those feed rollers 37 and 38.

The handle 91 is now depressed so as to disengage the drive wheels 64 from the table 21. The machine is now pushed to one end of the table to start the laying up of the goods. The end of the web of goods is then caught by the usual clamping or tamping device 165 customarily used with laying-up machines. The handle 91 is now pulled upwards to cause the drive wheels 64 to engage the top of the table 21. The machine may now be pushed to the other end of the table until it strikes the stop 93 or 94, depending on which direction it is being pushed. During the initial portion of this stroke of the machine, the cloth web will be fed by the feed rollers 37 and 38 which are now being driven through the drive means which includes the drive wheels 64. This drive means will continuously drive the feed rollers 37 and 38 in one direction at speeds to feed said cloth at the same rate that the carriage 20 is moved along said table 21 in either direction. Because of the initial feeding of the web there will be no pull on the web due to the fact that its end is being held by the clamping device 165, and the carriage 20 is being moved away from said clamping device 165.

However, after the initial feeding of the web, the machine reaches a position in which the means for separating the rollers 37 and 38 function. From this point on the goods is being laid on the table 21, and not being fed. This continues until the machine reaches the end portion of this stroke, whereupon the means for separating the rollers is rendered inoperative and the feed rollers 37 and 38 now contact each other and start feeding the web of goods. This feeding continues during the period that the feeding machine reaches the end of the stroke and is reversed to start moving back to the other end of the table 21. During this reversal period the clamping device 165 at this end of the table 21 will catch and hold the fold of the web. But there will be no tension or pull on the web, due to this catching and holding operation, because the web is now being fed by the rollers 37 and 38 at the same speed that the machine is being moved. When the machine reaches a certain position on the table 21, the means for separating the feed rollers again goes into operation and the machine now lays the web on the table 21 and does not feed it. The advantages of this arrangement have already been pointed out at the beginning of this specification.

It is believed that the detailed operation of the various parts of the machine is already understood, from the prior description.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. In a combination cloth laying-up and feeding machine, a carriage for supporting a supply of cloth and adapted to be reciprocated back and forth on a table, a roller support frame movably supported on said carriage and having a front portion, means for guiding said front portion to move in a vertical path, a pair of contacting feed rollers mounted on said front portion for receiving and feeding a web portion of said supply of cloth, guiding and tensioning means for supplying said web portion to said rollers, drive means mounted on said carriage for continuously driving one of said feed rollers in one direction at speeds to feed said cloth at the same rate that said carriage is moved along said table in either direction, means for limiting the distance through which said carriage may be reciprocated, and means for separating said rollers when said carriage is in position between the ends of its amplitude of reciprocation so that the moving carriage may lay said web portion of said supply of cloth on the table and contacting said rollers when said carriage is at end portions of its amplitude of reciprocation to feed said web portion of said supply of cloth at the same rate that said carriage is being moved, and means for clamping and holding said web portion as it is laid up at the ends of the amplitude of reciprocation of said carriage.

2. In a combination cloth laying-up and feeding machine, a carriage for supporting a supply of cloth and adapted to be reciprocated back and forth on a table, a roller support frame mounted on said carriage, feed rollers mounted on said frame, and drive means mounted on said carriage for continuously driving one of said feed rollers in one direction at speeds to feed said cloth at the same rate that said carriage is moved along said table in either direction, comprising a main shaft rotatively mounted on said frame, a pair of brackets turnably mounted on said shaft and extending to opposite sides of said shaft, a drive wheel rotatively mounted on each bracket for engaging said table, resilient means urging said brackets for engaging said drive wheel against said table, a pair of one way clutches mounted on said shaft and set in the same direction so that only one functions if turned in opposite directions, a transmission system from said drive wheels for turning said clutches in opposite directions, and a transmission from said shaft to one of said feed rollers.

3. In a combination cloth laying-up and feeding machine, a carriage for supporting a supply of cloth and adapted to be reciprocated back and forth on a table, a roller support frame mounted on said carriage, feed rollers mounted on said frame, and drive means mounted on said carriage for continuously driving one of said feed rollers in one direction at speeds to feed said cloth at the same rate that said carriage is moved along said table in either direction, comprising a main shaft rotatively mounted on said frame, a pair of brackets turnably mounted on said shaft and extending to opposite sides of said shaft, a drive wheel rotatively mounted on each bracket for engaging said drive wheel against said table, a pair of one way clutches mounted on said shaft and set in the same direction so that only one functions if turned in opposite directions, a transmission system from said drive wheels for turning said clutches in opposite directions, and a transmission from said shaft to one of said feed rollers, and means for moving said brackets to a position in which said drive wheels disengage said table.

4. In a combination cloth laying-up and feeding machine, a carriage for supporting a supply of cloth and adapted to be reciprocated back and forth on a table, a roller support frame pviotally and movably supported on said carriage and having a front portion, and means for guiding said front portion to move in a vertical path, comprising a vertical front arm mounted on said front portion, a parallelogram of pivotally connected arms extending rearwards and including said vertical front arms, means for horizontally slidably supporting one of the rear corners of said parallelogram of arms, and means for moving one of the rearwardly extending arms of said parallelogram of arms forwards and rearwards to maintain said vertical front arm in a vertical path when said front portion is moved up and down.

5. In a combination cloth laying-up and feeding machine, a carriage for supporting a supply of cloth and adapted to be reciprocated back and forth on a table, a roller support frame pivotally and movably supported on said carriage and having a front portion, and means for guiding said front portion to move in a vertical path, comprising a vertical front arm mounted on said front portion, a parallelogram of pivotally connected arms extending rearwards and including said vertical front arms, means for horizontally slidably supporting one of the rear corners of said parallelogram of arms, means for moving one of the rearwardly extending arms of said parallelogram of arms forwards and rearwards to maintain said vertical front arm in a vertical path when said front portion is moved up and down, and means for counter-balancing said roller support frame.

6. In a combination cloth laying-up and feeding machine, a carriage for supporting a supply of cloth and adapted to be reciprocated back and forth on a table, a roller support frame movably supported on said carriage and having a front portion, means for guiding said front portion to move in a vertical path, an endless member movably mounted on said carriage and having a side portion moving in a vertical path and connected with said front portion, a wheel engaging said endless member for assisting in supporting it, a releasable ratchet for preventing said wheel from turning in one direction to hold said front portion in various elevated positions, and means controlled by the reciprocation of said carriage for turning said ratchet to progressively raise said front portion.

7. In a combination cloth-laying-up and feed machine, a carriage for supporting a supply of cloth and adapted to be reciprocated back and forth on a table, a roller support frame movably supported on said carriage and having a front portion, means for guiding said front portion to move in a vertical path, a pair of contacting feed rollers mounted on said front portion for receiving and feeding a web portion of said supply of cloth, and drive means mounted on said carriage for continuously driving one of said feed rollers in one direction at speeds to feed said cloth at the same rate that said carriage is moved along said table in either direction, and including a driven shaft mounted on said carriage, an arm floating on said carriage, a second shaft and mounted on said floating arm, a second arm pivotally mounted on said second shaft and pivotally connected coaxially of said driven feed roller, a sprocket on said second shaft, a sprocket coaxially mounted on said driven feed roller, a chain connecting said sprockets, and a parallelogram of arms transmission connecting said driven shaft and second shaft.

8. In a combination cloth laying-up and feeding machine, a carriage for supporting a supply of cloth and adapted to be reciprocated back and forth on a table, a roller support frame movably supported on said carriage and having a front portion, means for guiding said front portion to move in a vertical path, a pair of contacting feed rollers mounted on said front portion for receiving and feeding a web portion of said supply of cloth, guiding and tensioning means for supplying said web portion to said rollers, drive means mounted on said carriage for continuously driving one of said feed rollers in one direction at speeds to feed said cloth at the same rate that said carriage is moved along said table in either direction, means for limiting the distance through which said carriage may be reciprocated, and means for separating said rollers when said carriage is in position between the ends of its amplitude of reciprocation so that the moving carriage may lay said web portion of said supply of cloth on the table and contacting said rollers when said carriage is at end portions of its amplitude of reciprocation to feed said web portion of said supply of cloth at the same rate that said carriage is being moved, including abutment members stationarily adjustably mounted at the end portions of the amplitude of reciprocation of said carriage for controlling the point where said rollers separate and where they contact each other.

9. In a combination cloth laying-up and feeding machine, a carriage for supporting a supply of cloth and adapted to be reciprocated back and forth on a table, a roller support frame mounted on said carriage, feed rollers mounted on said frame, and drive means mounted on said carriage for continuously driving one of said feed rollers in one direction at speeds to feed said cloth at the same rate that said carriage is moved along said table in either direction, comprising a shaft rotatively supported on said carriage, a pair of one way clutches mounted on said shaft, a drive wheel for engaging said table, transmission means from said drive wheel to said clutches for turning said shaft continuously in the same direction when said carriage is reciprocated and said drive wheel turns in both directions, and transmission means from said shaft to said one feed roller, said latter transmission means includes an auxiliary shaft rotatively supported on said roller support frame, a chain transmission means connecting said shaft and auxiliary shaft and including a system for maintaining the tension of said chain in all positions of said roller support frame, and a transmission system from said auxiliary shaft to said feed roller.

10. In a combination cloth laying-up and feeding machine, a carriage for supporting a supply of cloth and adapted to be reciprocated back and forth on a table, a roller support frame mounted on said carriage, feed rollers mounted on said frame, and drive means mounted on said carriage for continuously driving one of said feed rollers in one direction at speeds to feed said cloth at the same rate that said carriage is moved along said table in either direction, comprising a main shaft rotatively mounted on said frame, a pair of brackets turnably mounted on said shaft and extending to opposite sides of said shaft, a drive wheel rotatively mounted on each bracket for engaging said drive wheel against said table, a pair of one way clutches mounted on said shaft and set in the same direction so that only one functions if turned in opposite directions, a transmission system from said drive wheels for turning said clutches in opposite directions, and a transmission from said shaft to one of said feed rollers, and means for moving said brackets to a position in which said drive wheels disengage said table, comprising a pair of pivotally connected links pivotally connected with said brackets and normally extending slightly downwards, and means for lifting said links upwards above a dead center for moving said brackets upwards and outwards and locking the brackets in raised positions.

11. In a combination cloth laying-up and feeding machine, a carriage for supporting a supply of cloth and adapted to be reciprocated back and forth on a table, a roller support frame pivotally and movably supported on said carriage and having a front portion, and means for guiding said front portion to move in a vertical path, comprising a vertical front arm mounted on said front portion, a parallelogram of pivotally connected arms extending rearwards and including said vertical front arms, means for horizontally slidably supporting one of the rear corners of said parallelogram of arms, and means for moving one of the rearwardly extending arms of said parallelogram of arms forwards and rearwards to maintain said vertical front arm in a vertical path when said front portion is moved up and down, said means for horizontally slidably supporting one of the rear corners of said parallelogram of arms comprises projections from parallelogram of arms engaging horizontal slots in said carriage.

12. In a combination cloth laying-up and feeding machine, a carriage for supporting a supply of cloth and adapted to be reciprocated back and forth on a table, a roller support frame movably supported on said carriage and having a front portion, means for guiding said front portion to move in a vertical path, an endless member movably mounted on said carriage and having a side portion moving in a vertical path and connected with said front portions, a wheel engaging said endless member for assisting in supporting it, a releasable ratchet for preventing said wheel from turning in one direction to hold said front portion in various elevated positions, means controlled by the reciprocation of said carriage for turning said ratchet to progressively raise said front portion, and means for controlling the amount that said ratchet turns for each reciprocation of said carriage.

13. In a combination cloth laying-up and feeding machine, a carriage for supporting a supply of cloth and adapted to be reciprocated back and forth on a table, a roller support frame movably supported on said carriage and having a front portion, means for guiding said front portion to move in a vertical path, a pair of contacting feed rollers mounted on said front portion for receiving and feeding a web portion of said supply of cloth, guiding and tensioning means for supplying said web portion to said rollers, drive means mounted on said carriage for continuously driving one of said feed rollers in one direction at speeds to feed said cloth at the same rate that said carriage is moved along said table in either direction, means for limiting the distance through which said carriage may be reciprocated, and means for separating said rollers when said carriage is in position between the ends of its amplitude of reciprocation so that the moving carriage may lay said web portion of said supply of cloth on the table and contacting said rollers when said carriage is at end portions of its amplitude of reciprocation to feed said web portion of said supply of cloth at the same rate that said carriage is being moved, comprising abutment members adjustably mounted in fixed positions along the end portions of the path of reciprocation of said carriage, and means controlled by engagement with said abutment members for separating said feed rollers when the carriage is in between the abutment members, and means for clamping and holding said web portion as it is laid up at the ends of the amplitude of reciprocation of said carriage.

14. In a combination cloth laying-up and feeding machine, a carriage for supporting a supply of cloth and adapted to be reciprocated back and forth on a table, a roller support frame movably supported on said carriage and having a front portion, means for guiding said front portion to move in a vertical path, a pair of contacting feed rollers mounted on said front portion for receiving and feeding a web portion of said supply of cloth, guiding and tensioning means for supplying said web portion to said rollers, drive means mounted on said carriage for continuously driving one of said feed rollers in one direction at speeds to feed said cloth at the same rate that said carriage is moved along said table in either direction, means for limiting the distance through which said carriage may be reciprocated, and means for separating said rollers when said carriage is in position between ends of its amplitude of reciprocation so that the moving carriage may lay said web portion of said supply of cloth on the table and contacting said rollers when said carriage is at end portions of its amplitude of reciprocation to feed said web portion of said supply of cloth at the same rate that said carriage is being moved, comprising abutment members adjustably mounted in fixed positions along the end portions of the path of reciprocation of said carriage, and means controlled by engagement with said abutment members for separating said feed rollers when the carriage is in between the abutment members, and including an endless chain supported on a pair of spaced sprockets and having pins engageable with same abutment members to cause motion of the chain, and a transmission system controlled by the position of said chain for separating said feed rollers and for permitting the feed rollers to contact each other.

15. In a combination cloth laying-up and feeding machine, a carriage for supporting a supply of cloth and adapted to be reciprocated back and forth on a table, a roller support frame pivotally and movably supported on said carriage and having a front portion, and means for guiding said front portion to move in a vertical path, comprising a vertical front arm mounted on said front portion, a parallelogram of pivotally connected arms extending rearwards and including said vertical front arms, means for horizontally slidably supporting one of the rear corners of said parallelogram of arms, and means for moving one of the rearwardly extending arms of said parallelogram of arms forwards and rearwards to maintain said vertical front arm in a vertical path when said front portion is moved up and down, comprising projections from said rearwardly extending arms engaging in cam slots formed in said carriage.

16. A cloth spreader for tubular goods, comprising a frame for engagement into the tubular goods, and having a bottom arm, and ball bearings mounted on said bottom arm for resting on the feeding and laying rollers of a combination cloth feeding and laying-up machine.

HERMAN WALTER GILBERT.
WALTER DEICHMANN.
FRANK H. DEXTER.